(12) United States Patent
Shyu

(10) Patent No.: US 6,445,829 B1
(45) Date of Patent: Sep. 3, 2002

(54) JOINT COSINE TRANSFORMING AND QUANTIZING DEVICE AND JOINT INVERSE QUANTIZING AND INVERSE COSINE TRANSFORMING DEVICE

(75) Inventor: Rong-Fuh Shyu, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/378,170

(22) Filed: Aug. 20, 1999

Related U.S. Application Data

(63) Continuation-in-part of application No. 09/153,750, filed on Sep. 15, 1998, now Pat. No. 6,160,920.

(51) Int. Cl.[7] .............................. G06K 9/36; G06K 9/46
(52) U.S. Cl. ........................ 382/250; 382/251; 382/233
(58) Field of Search ................................ 382/250, 251, 382/233, 277; 708/402

(56) References Cited

U.S. PATENT DOCUMENTS

| | | | | |
|---|---|---|---|---|
| 5,029,122 A | * | 7/1991 | Uetani | 708/402 |
| 5,257,213 A | * | 10/1993 | Kim et al. | 708/401 |
| 5,471,412 A | | 11/1995 | Shyu | |
| 5,649,077 A | * | 7/1997 | On et al. | 708/401 |

* cited by examiner

Primary Examiner—Phuoc Tran
(74) Attorney, Agent, or Firm—Christensen O'Connor Johnson Kindness PLLC

(57) ABSTRACT

Each of the discrete cosine transforming (DCT) unit of a joint cosine transforming and quantizing device, and the inverse discrete cosine transforming (IDCT) unit of a joint inverse quantizing and inverse cosine transforming device includes a multiplication operation unit that is implemented in a look-up table device having a look-up table and an output multiplexer. The look-up table has a number of data fields, each of which contains products associated with a respective one of a corresponding number of coefficients used in multiplication-involving stages of a DCT or IDCT fast algorithm. The look-up table further has a number of outputs corresponding respectively to the data fields, and can be addressed in order to output the products, that correspond to the address data and that are stored in the data fields, at the outputs of the look-up table. The output multiplexer has data inputs connected to the outputs of the look-up table, and is operable so as to select one of the data inputs thereof and provide data at the selected one of the data inputs thereof to a data output of the output multiplexer.

10 Claims, 9 Drawing Sheets

C(i,j)

| $c_0*c_0$ | $c_0*c_1$ | $c_0*c_2$ | $c_0*c_3$ | $c_0*c_4$ | $c_0*c_5$ | $c_0*c_6$ | $c_0*c_7$ |
|---|---|---|---|---|---|---|---|
| $c_1*c_0$ | $c_1*c_1$ | $c_1*c_2$ | $c_1*c_3$ | $c_1*c_4$ | $c_1*c_5$ | $c_1*c_6$ | $c_1*c_7$ |
| $c_2*c_0$ | $c_2*c_1$ | $c_2*c_2$ | $c_2*c_3$ | $c_2*c_4$ | $c_2*c_5$ | $c_2*c_6$ | $c_2*c_7$ |
| $c_3*c_0$ | $c_3*c_1$ | $c_3*c_2$ | $c_3*c_3$ | $c_3*c_4$ | $c_3*c_5$ | $c_3*c_6$ | $c_3*c_7$ |
| $c_4*c_0$ | $c_4*c_1$ | $c_4*c_2$ | $c_4*c_3$ | $c_4*c_4$ | $c_4*c_5$ | $c_4*c_6$ | $c_4*c_7$ |
| $c_5*c_0$ | $c_5*c_1$ | $c_5*c_2$ | $c_5*c_3$ | $c_5*c_4$ | $c_5*c_5$ | $c_5*c_6$ | $c_5*c_7$ |
| $c_6*c_0$ | $c_6*c_1$ | $c_6*c_2$ | $c_6*c_3$ | $c_6*c_4$ | $c_6*c_5$ | $c_6*c_6$ | $c_6*c_7$ |
| $c_7*c_0$ | $c_7*c_1$ | $c_7*c_2$ | $c_7*c_3$ | $c_7*c_4$ | $c_7*c_5$ | $c_7*c_6$ | $c_7*c_7$ |

P(i,j)

| p0*p0 | p0*p1 | p0*p2 | p0*p3 | p0*p4 | p0*p5 | p0*p6 | p0*p7 |
| p1*p0 | p1*p1 | p1*p2 | p1*p3 | p1*p4 | p1*p5 | p1*p6 | p1*p7 |
| p2*p0 | p2*p1 | p2*p2 | p2*p3 | p2*p4 | p2*p5 | p2*p6 | p2*p7 |
| p3*p0 | p3*p1 | p3*p2 | p3*p3 | p3*p4 | p3*p5 | p3*p6 | p3*p7 |
| p4*p0 | p4*p1 | p4*p2 | p4*p3 | p4*p4 | p4*p5 | p4*p6 | p4*p7 |
| p5*p0 | p5*p1 | p5*p2 | p5*p3 | p5*p4 | p5*p5 | p5*p6 | p5*p7 |
| p6*p0 | p6*p1 | p6*p2 | p6*p3 | p6*p4 | p6*p5 | p6*p6 | p6*p7 |
| p7*p0 | p7*p1 | p7*p2 | p7*p3 | p7*p4 | p7*p5 | p7*p6 | p7*p7 |

INPUT QUANTIZED DCT DATA BLOCK → INVERSE QUANTIZATION USING MODIFIED DEQUANTIZER MATRIX → SCALED FIRST 1-D IDCT TRANSFORM → SCALED 1-D INVERSE TRANSFORM DATA → SCALED SECOND 1-D IDCT TRANSFORM → IDCT DATA

JOINT COSINE TRANSFORMING AND QUANTIZING DEVICE AND JOINT INVERSE QUANTIZING AND INVERSE COSINE TRANSFORMING DEVICE

CROSS-REFERENCE TO RELATED APPLICATION

This application is a continuation-in-part (CIP) of co-pending U.S. patent application Ser. No. 09/153,750, filed by the applicant on Sep. 15, 1998 now U.S. Pat. No. 6,190,920.

BACKGROUND OF THE INVENTION

1. Field of the Invention

The invention relates to video compression and decompression techniques, more particularly to a video compressing apparatus and a video decompressing apparatus that perform a reduced number of multiplication operations.

2. Description of the Related Art

Discrete cosine transform (DCT) is widely adopted in video compression algorithms, such as MPEG for motion picture coding, and JPEG for still picture coding. Similarly, inverse discrete cosine transform (IDCT) is adopted in the corresponding inverse process for decompression of compressed video data.

DCT and IDCT operations typically involve a plurality of multiplication and addition operations. In general, multiplication operations for DCT and IDCT processing are relatively time-consuming and require relatively complex hardware.

In U.S. Pat. No. 5,471,412, the entire disclosure of which is incorporated herein by reference, the applicant disclosed six-stage DCT/IDCT fast algorithms that involve only thirteen multiplication operations for one-dimensional transformation, or a total number of 208 (2×8×13) multiplication operations for two-dimensional transformation of an 8×8 data block. It is desirable to further reduce the number of multiplication operations in order to achieve a higher processing speed during video compression and/or video decompression.

In co-pending U.S. patent application Ser. No. 09/153, 750, now U.S. Pat. No. 6,160,920, the entire disclosure of which is also incorporated herein by reference, the applicant disclosed a cosine transforming and quantizing device, and an inverse quantizing and inverse cosine transforming device.

The cosine transforming and quantizing device comprises a discrete cosine transforming unit and a quantizer. The discrete cosine transforming unit performs discrete cosine transform (DCT) on an input data block based on a six-stage DCT fast algorithm. The discrete cosine transforming unit dispenses with a sixth intrinsic multiplication stage of the DCT fast algorithm to result in scaled transform data. The quantizer is connected to the discrete cosine transforming unit, and quantizes the scaled transform data in accordance with a modified quantizer matrix that is obtained by compensating a predetermined original quantizer matrix with a set of scaling coefficients derived from the sixth intrinsic multiplication stage of the DCT fast algorithm to result in quantized DCT data corresponding to the input data block. Through the use of the cosine transforming and quantizing device, the number of multiplication operations in a video compressing apparatus can be reduced to result in a higher processing speed.

The inverse quantizing and inverse cosine transforming device comprises an inverse quantizer and an inverse discrete cosine transforming unit. The inverse quantizer dequantizes input quantized discrete cosine transform (DCT) data in accordance with a modified dequantizer matrix that is obtained by compensating a predetermined original dequantizer matrix with a set of pre-scaling coefficients derived from a first intrinsic multiplication stage of a six-stage inverse discrete cosine transform (IDCT) fast algorithm to result in scaled dequantized data. The inverse discrete cosine transforming unit is connected to the inverse quantizer, and is operable to perform IDCT on the scaled dequantized data based on the six-stage IDCT fast algorithm. The inverse discrete cosine transforming unit dispenses with the first intrinsic multiplication stage of the IDCT fast algorithm to result in IDCT data corresponding to the input quantized DCT data. Through the use of the inverse quantizing and inverse cosine transforming device, the number of multiplication operations in a video compressing/ decompressing apparatus can be reduced to result in a higher processing speed.

SUMMARY OF THE INVENTION

The object of the present invention is to provide a joint cosine transforming and quantizing device which has a relatively simple discrete cosine transforming unit that is capable of performing a reduced number of multiplication operations as compared to the prior art.

Another object of the present invention is to provide a joint inverse quantizing and inverse cosine transforming device which has a relatively simple inverse discrete cosine transforming unit that is capable of performing a reduced number of multiplication operations as compared to the prior art.

According to one aspect of the invention, a joint cosine transforming and quantizing device comprises a discrete cosine transforming unit and a quantizer.

The discrete cosine transforming unit performs discrete cosine transform (DCT) on an input data block based on a six-stage DCT fast algorithm that is separated into a scaled DCT stage and a scaling DCT stage. The scaled DCT stage includes a first butterfly stage, a second post-addition multiplication stage, a third butterfly stage, a fourth post-addition multiplication stage, and a fifth butterfly stage. The scaling DCT stage includes a sixth intrinsic multiplication stage. The discrete cosine transforming unit dispenses with the scaling DCT stage to result in scaled transform data.

The quantizer is connected to the discrete cosine transforming unit, and quantizes the scaled transform data in accordance with a modified quantizer matrix that is obtained by compensating a predetermined original quantizer matrix with a scaling coefficient matrix derived from the scaling DCT stage of the DCT fast algorithm to result in quantized DCT data corresponding to the input data block.

The discrete cosine transforming unit includes a data register unit, an input multiplexer, a butterfly operation unit, an adder and a multiplication operation unit.

The data register unit has first and second write ports and first and second read ports.

The input multiplexer has a first data input adapted to receive the input data block, a second data input connected to the first read port of the data register unit, and a data output. The input multiplexer is operable so as to provide data at a selected one of the first and second data inputs to the data output.

The butterfly operation unit has an input connected to the data output of the input multiplexer, and an output connected to the first write port of the data register unit. The butterfly operation unit is operable so as to perform the first, third and fifth butterfly stages of the DCT fast algorithm and so as to generate respectively first-stage, third-stage and fifth-stage output data when performing the first, third and fifth butterfly stages of the DCT fast algorithm.

The adder has a data input connected to the second read port of the data register unit, and a data output.

The multiplication operation unit has an input connected to the data output of the adder, and an output connected to the second write port of the data register unit.

The adder and the multiplication operation unit are operable so as to perform the second and fourth post-addition multiplication stages of the DCT fast algorithm and so as to generate respectively second-stage and fourth-stage output data when performing the second and fourth post-addition multiplication stages of the DCT fast algorithm.

The multiplication operation unit includes a look-up table and an output multiplexer.

The look-up table has a number of data fields, each of which contains products associated with a respective one of a corresponding number of coefficients used in the second and fourth post-addition multiplication stages of the DCT fast algorithm. The look-up table further has a number of outputs corresponding respectively to the data fields. The look-up table is connected to the data output of the adder so as to be addressed by data thereat in order to output the products, that correspond to the data from the adder and that are stored in the data fields, at the outputs of the look-up table.

The output multiplexer has data inputs connected to the outputs of the look-up table, and a data output connected to the second write port of the data register unit. The output multiplexer is operable so as to select one of the data inputs thereof and provide data at the selected one of the data inputs thereof to the data register unit.

According to another aspect of the invention, a joint inverse quantizing and inverse cosine transforming device comprises an inverse quantizer and an inverse discrete cosine transforming unit.

The inverse quantizer dequantizes input quantized discrete cosine transform (DCT) data in accordance with a modified dequantizer matrix that is obtained by compensating a predetermined original dequantizer matrix with a pre-scaling coefficient matrix derived from a pre-scaling inverse discrete cosine transform (IDCT) stage of a six-stage IDCT fast algorithm to result in scaled dequantized data. The pre-scaling IDCT stage includes a first intrinsic multiplication stage of the IDCT fast algorithm. The IDCT fast algorithm further has a scaled IDCT stage that includes a second butterfly stage, a third post-multiplication subtraction stage, a fourth butterfly stage, a fifth post-multiplication subtraction stage, and a sixth butterfly stage.

The inverse discrete cosine transforming unit is connected to the inverse quantizer and is operable to perform the scaled IDCT stage of the IDCT fast algorithm on the scaled dequantized data. The inverse discrete cosine transforming unit dispenses with the pre-scaling IDCT stage of the IDCT fast algorithm to result in IDCT data corresponding to the input quantized DCT data.

The inverse discrete cosine transforming unit includes a data register unit, an input multiplexer, a butterfly operation unit, a multiplication operation unit, and a subtracter.

The data register unit has first and second write ports and first and second read ports.

The input multiplexer has a first data input to receive the scaled dequantized data, a second data input connected to the first read port of the data register unit, and a data output. The input multiplexer is operable so as to provide data at a selected one of the first and second data inputs to the data output.

The butterfly operation unit has an input connected to the data output of the input multiplexer, and an output connected to the first write port of the data register unit. The butterfly operation unit is operable so as to perform the second, fourth and sixth butterfly stages of the IDCT fast algorithm and so as to generate respectively second-stage, fourth-stage and sixth-stage output data when performing the second, fourth and sixth butterfly stages of the IDCT fast algorithm.

The multiplication operation unit has a data input connected to the second read port of the data register unit and a data output.

The subtracter has an input connected to the data output of the multiplication operation unit, and an output connected to the second write port of the data register unit.

The multiplication operation unit and the subtracter are operable so as to perform the third and fifth post-multiplication subtraction stages of the IDCT fast algorithm and so as to generate respectively third-stage and fifth-stage output data when performing the third and fifth post-multiplication subtraction stages of the IDCT fast algorithm.

The multiplication operation unit includes a look-up table and an output multiplexer.

The look-up table has a number of data fields, each of which contains products associated with a respective one of a corresponding number of coefficients used in the third and fifth post-multiplication subtraction stages of the IDCT fast algorithm. The look-up table further has a number of outputs corresponding respectively to the data fields. The look-up table is connected to the second read port of the data register unit so as to be addressed by data thereat in order to output the products, that correspond to the data from the second read port and that are stored in the data fields, at the outputs of the look-up table.

The output multiplexer has data inputs connected to the outputs of the look-up table, and a data output connected to the input of the subtracter. The output multiplexer is operable so as to select one of the data inputs thereof and provide data at the selected one of the data inputs thereof to the subtracter.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
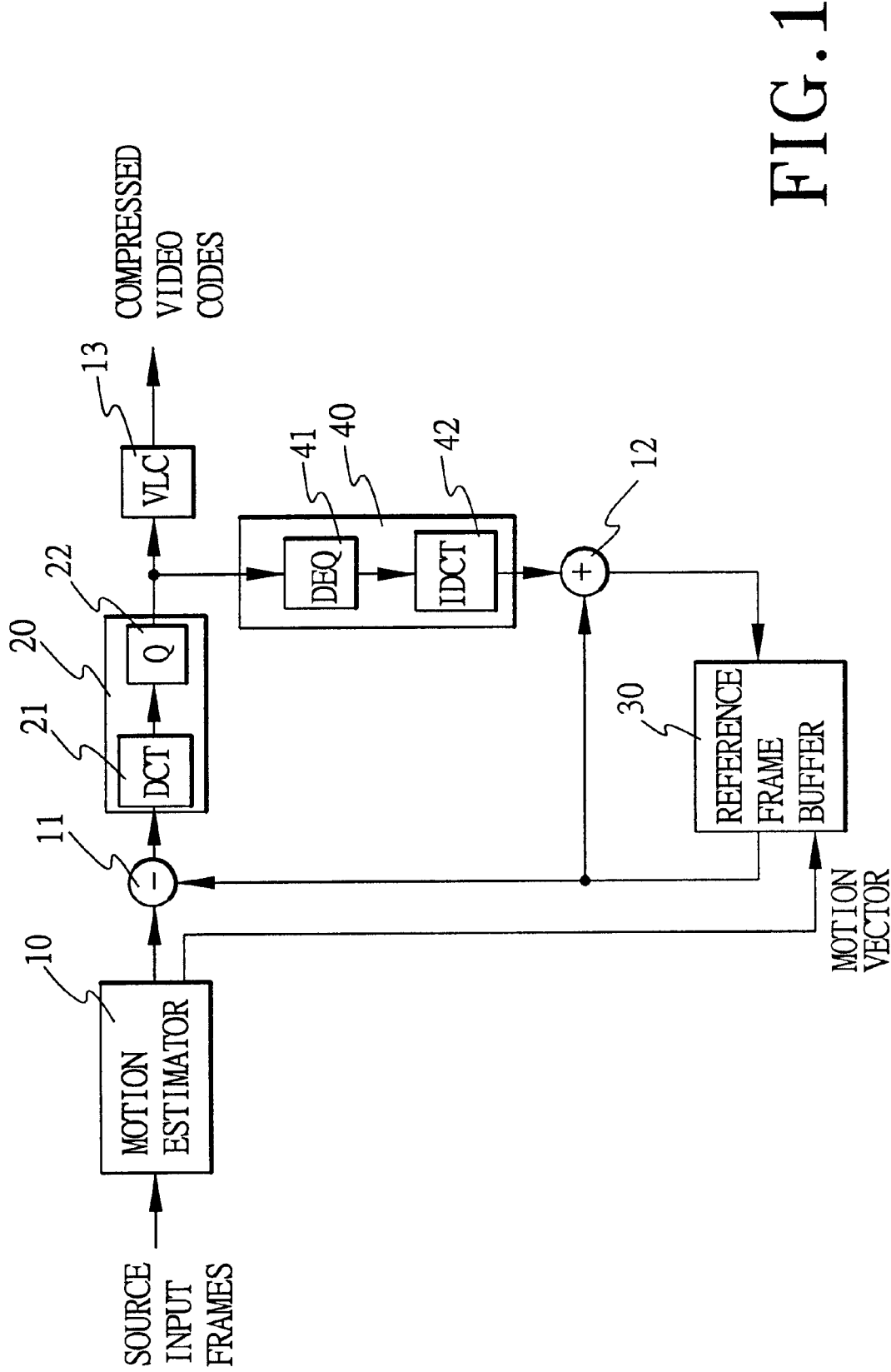
FIG. 1 is a schematic circuit block diagram of a video encoding apparatus that incorporates the preferred embodiments of a joint cosine transforming and quantizing device and a joint inverse quantizing and inverse cosine transforming device according to the present invention.

FIG. 1 is a schematic circuit block diagram illustrating a video encoding apparatus that involves discrete cosine transform. A motion estimator 10 receives source input frames and performs motion estimation relative to a previous and/or a future input frame. The motion estimator 10 generates motion vectors in case the input frame is a predictive-coded frame or a bi-directional predictive-coded frame, both of which are commonly referred to as non-intra coded frames. Otherwise, for intra-coded frames, the input frame is provided directly to a joint cosine transforming and quantizing device 20 that includes a discrete cosine transforming (DCT) unit 21 and a quantizer (Q) 22 connected to the DCT unit 21. The DCT unit 21 performs discrete cosine transform on the input frame, and provides transform data to the quantizer 22. The quantizer 22 is responsible for quantizing the transform data from amplitudes that lie within a number of preset ranges to a set of finite levels. The non-intra coded frames are also processed by the joint cosine transforming and quantizing device 20, but only after reference pixel values that come from reference frames stored in a reference frame buffer 30 are subtracted from pixel values of the current frame via a subtracter 11. As such, in case of non-intra coded frames, the joint cosine transforming and quantizing device 20 only processes the differences of the pixel values. A joint inverse quantizing and inverse cosine transforming device 40 includes an inverse quantizer (DeQ) 41 and an inverse discrete cosine transforming (IDCT) unit 42 connected to the inverse quantizer 41. The inverse quantizer 41 performs the inverse operation of the quantizer 22. The IDCT unit 42 performs the inverse operation of the DCT unit 21. Reference frames for the non-intra coded frames are provided by an adder 12. The reference frames can be intra-coded frames that are stored directly in the reference frame buffer 30 after reconstruction by the joint inverse quantizing and inverse cosine transforming device 40. Alternatively, the reference frames can be predictive-coded frames that are further reconstructed with reference to a previous reference frame stored in the reference frame buffer 30. In this case, the adder 12 compensates the IDCT retrieved difference of the pixel values of the predictive-coded frame with its reference frame, and sends the reconstructed predictive-coded frame to the reference frame buffer 30. The motion vector from the motion estimator 10 is used to address the appropriate pixels of the reference frames in the reference frame buffer 30 for conducting the subtraction operation in order to encode non-intra coded frames, and for conducting the compensating operation in order to reconstruct the predictive-coded reference frames. A variable length encoder (VLC) 13 is connected to the output of the quantizer 22, and is used to perform entropy coding, such as Huffman coding, to map the quantized transform data to variable-length codes which are subsequently outputted as compressed video codes.

The motion estimator 10 removes inter-frame redundancy of the source input frames. The quantizer 22 removes insignificant portions of the video data, which are not sensitive to the human visual system. The variable length encoder 13 further compresses the video data by applying entropy coding techniques so as to result in compressed video data with a compression ratio ranging from tens to hundreds.

If the source input frames are still images, like photographs, which have no inter-frame relationship, the video encoding apparatus of FIG. 1 can be reduced to comprise only the joint cosine transforming and quantizing device 20 and the variable length encoder 13. The motion estimator 10, the subtracter 11 for providing pixel value differences, the adder 12 for providing reference frames, the reference frame buffer 30 for storing the reference frames, and the joint inverse quantizing and inverse cosine transforming device 40 are omitted.

The general concepts of the encoding apparatus and the encoding process for video signals as described above are well known in the art, and are widely used in digital video compression technology, such as MPEG and JPEG.

Figure 2:
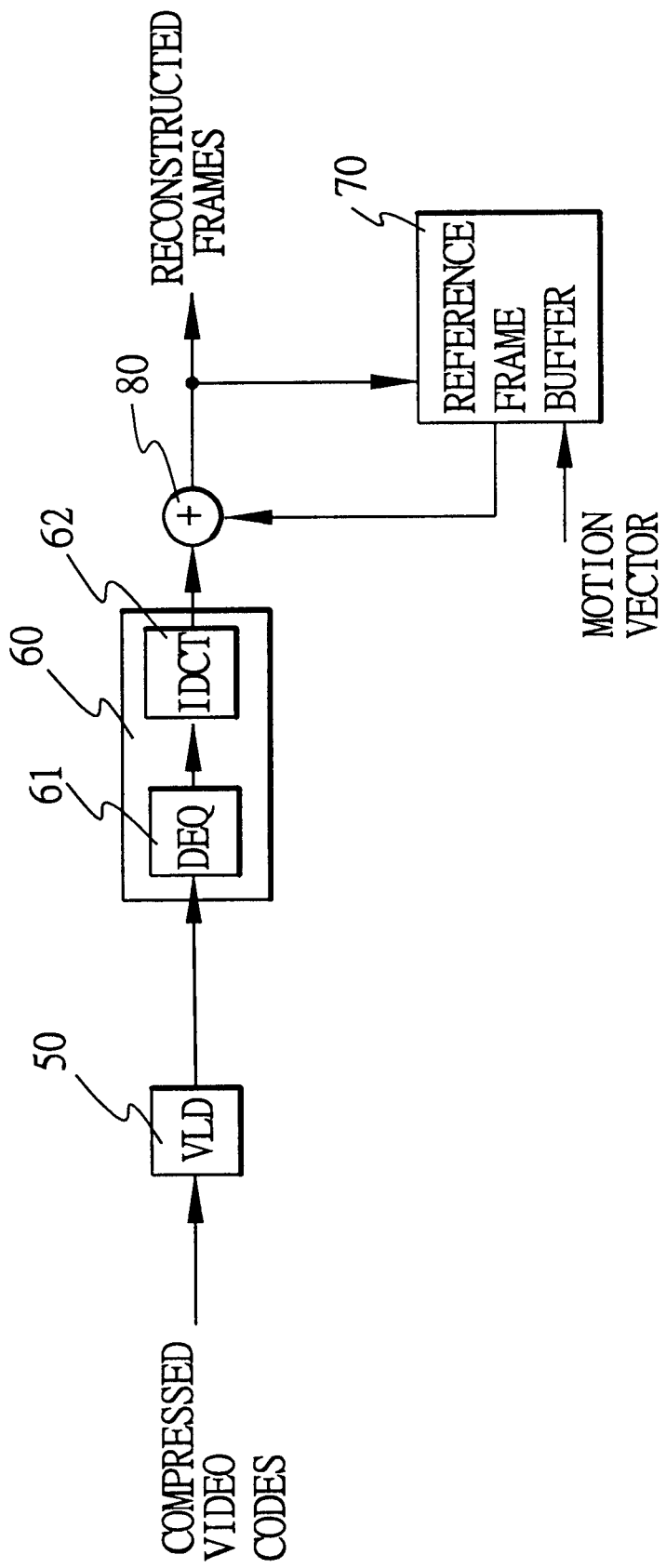
FIG. 2 is a schematic circuit block diagram of a video decoding apparatus that incorporates the preferred embodiment of the joint inverse quantizing and inverse cosine transforming device according to the present invention.

FIG. 2 is a schematic circuit block diagram illustrating a video decoding apparatus that corresponds to the video encoding apparatus of FIG. 1. The video decoding apparatus comprises a variable length decoder (VLD) 50, a joint inverse quantizing and inverse cosine transforming device 60 including an inverse quantizer (DeQ) 61 and an inverse discrete cosine transforming (IDCT) unit 62 connected to the inverse quantizer 61, a reference frame buffer 70, and an adder 80. The variable length decoder 50 processes the compressed video codes, which are variable length codes, to obtain the quantized DCT data. The inverse quantizer 61 performs an inverse quantization operation on the quantized DCT data to obtain dequantized DCT data. The IDCT unit 62 performs IDCT on the dequantized DCT data from the quantizer 61 to obtain IDCT data, which are pixel values for intracoded frames, and differences of pixel values with reference frames for non-intra coded frames. The function of the reference frame buffer 70 is the same as that of the reference frame buffer 30 in the video encoding apparatus of FIG. 1. The adder 80 compensates the IDCT data with the reference frames coming from the reference frame buffer 70 for the non-intra coded frames. The compensated non-intra coded frames and the intra-coded frames from the IDCT unit 62 constitute the reconstructed frames. The reconstructed intra-coded frames and the predictive-coded frames are also stored in the reference frame buffer 70 to serve as reference frames. The reference frame buffer 70 has a motion vector input for addressing the appropriate pixels of the reference frames in the reference frame buffer 70 to conduct the compensating operation when reconstructing the non-intra coded frames.

Similarly, if the compressed video codes only involve still images, like photographs, which have no inter-frame relationship, the video decoding apparatus of FIG. 2 can be reduced to comprise only the variable length decoder 50 and the joint inverse quantizing and inverse cosine transforming device 60. The reference frame buffer 70 and the adder 80 for reconstructing the non-intra-coded frames are omitted.

The general concepts of the decoding apparatus and the decoding process for video signals as described above are also well known in the art, and are widely used in digital video decompression technology, such as MPEG and JPEG.

Figure 3:
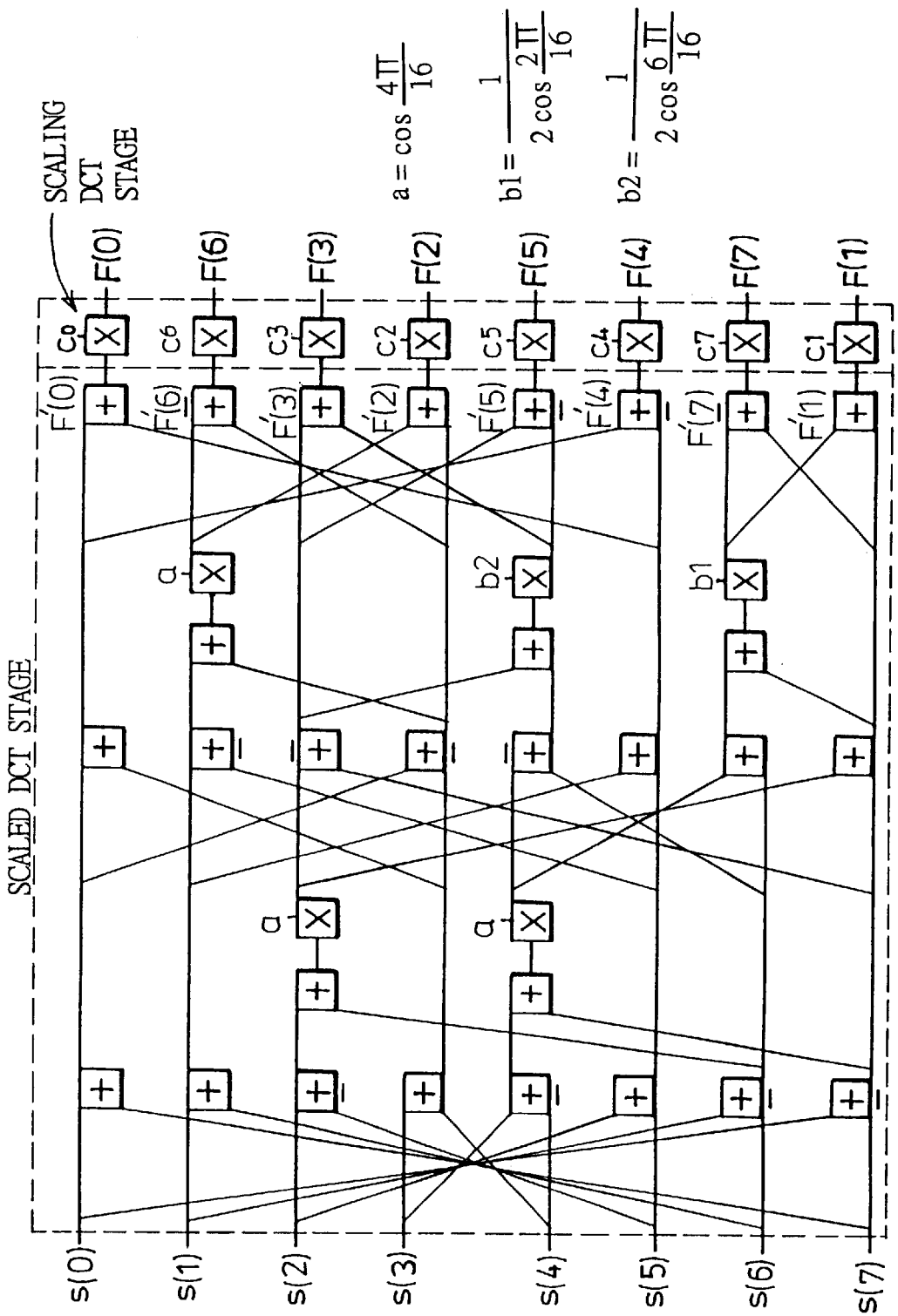
FIG. 3 is a flow graph of a six-stage DCT fast algorithm that is used in a one-dimensional transform operation of the preferred embodiment of a joint cosine transforming and quantizing device according to the present invention.

FIG. 3 illustrates a flow graph of a six-stage DCT fast algorithm that is used in a one-dimensional transform operation of the preferred embodiment of a joint cosine transforming and quantizing device according to the present invention. The DCT fast algorithm is similar to the one disclosed in U.S. Pat. No. 5,471,412. However, in the preferred embodiment, the DCT fast algorithm is separated into a scaled DCT stage and a scaling DCT stage. The scaled DCT stage includes the first five stages of the DCT fast algorithm, i.e. a first stage involving four butterfly operations, a second stage involving two post-addition multiplication operations, a third stage involving four butterfly operations, a fourth stage involving three post-addition multiplication operations, and a fifth stage involving four butterfly operations. The scaling DCT stage includes the sixth stage of the DCT fast algorithm involving eight intrinsic multiplication operations. The scaled DCT stage has inputs s (m), where m=0 to 7, and outputs F'(n), where n=0 to 7, which serve as scaled transform data. The outputs F'(n) of the scaled DCT stage serve as inputs of the scaling DCT stage. In the scaling DCT stage, the inputs F'(n) thereto are multiplied by corresponding constants Cn to obtain outputs F(n), which serve as the DCT transformed data.

Figure 4:
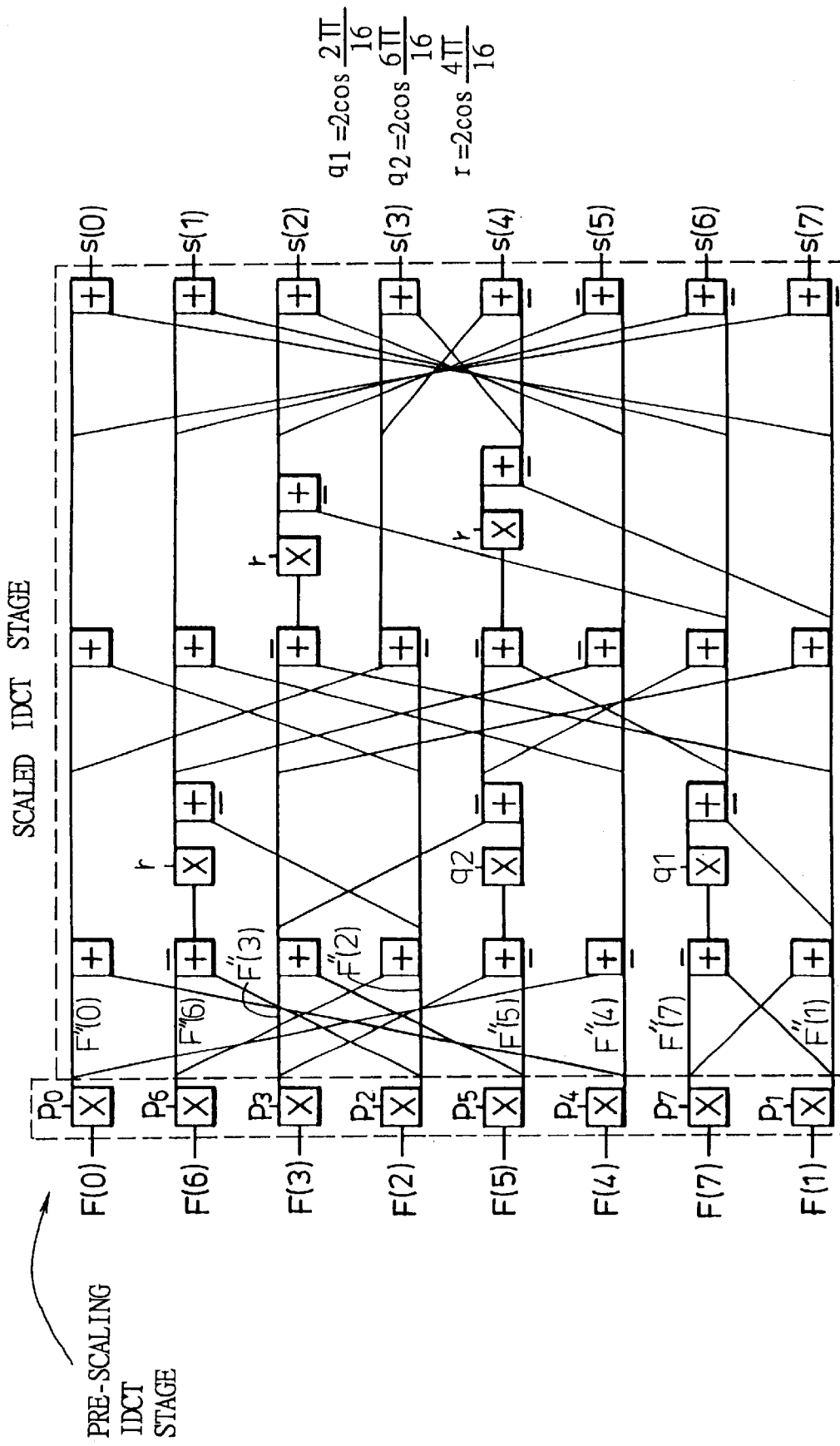
FIG. 4 is a flow graph of a six-stage IDCT fast algorithm that is used in a one-dimensional inverse transform operation of the preferred embodiment of a joint inverse quantizing and inverse cosine transforming device according to the present invention.

FIG. 4 illustrates a flow graph of a six-stage IDCT fast algorithm that is used in a one-dimensional inverse transform operation of the preferred embodiment of a joint inverse quantizing and inverse cosine transforming device according to the present invention. The IDCT fast algorithm is similar to the one disclosed in U.S. Pat. No. 5,471,412. However, in the preferred embodiment, the IDCT fast algorithm is separated into a pre-scaling IDCT stage and a scaled IDCT stage. The pre-scaling IDCT stage includes the first stage of the IDCT fast algorithm involving eight intrinsic multiplication operations. The scaled IDCT stage includes the second to sixth stages of the IDCT fast algorithm, i.e. a second stage involving four butterfly operations, a third stage involving three post-multiplication subtraction operations, a fourth stage involving four butterfly operations, a fifth stage involving two post-multiplication subtraction operations, and a sixth stage involving four butterfly operations. The pre-scaling IDCT stage has inputs F(n), where n=0 to 7, that are multiplied by corresponding constants Pn to obtain outputs F"(n), which serve as pre-scaled transform data. The outputs F"(n) of the pre-scaling IDCT stage serve as inputs of the scaled IDCT stage. The scaled IDCT stage has outputs s(m), where m=0 to 7, which serve as the IDCT transformed data.

In the quantizer of the joint cosine transforming and quantizing device of the preferred embodiment, quantization is performed on an 8×8 block basis using a predetermined quantizer matrix adaptable for different image attributes. That is to say, the predetermined quantizer matrix may differ for luminance and chrominance components, for intra-coded and non-intra coded frames, and from one video sequence to another video sequence, and so on. A fundamental formula of quantization is:

$$M(i,j)=f(i,j)/Q(i,j)$$

where i,j=0, 1, . . . 7, f(i,j) represents DCT data,

Q(i,j) represents the predetermined quantizer matrix, and

M(i,j) represents the quantized transform data.

In the inverse quantizer of the joint inverse quantizing and inverse cosine transforming device of the preferred embodiment, inverse quantization is also performed on an 8×8 block basis using a predetermined dequantizer matrix. A fundamental formula of dequantization is:

$$f'(i,j)=M(i,j)*Q(i,j)$$

where i,j=0, 1, . . . 7, f'(i,j) represents dequantized transform data,

Q(i,j) represents the predetermined dequantizer matrix, and

M(i,j) represents the quantized transform data.

Referring again to FIG. 1, unlike the prior art, the joint cosine transforming and quantizing device 20 of the preferred embodiment is characterized in that the DCT unit 21 performs the scaled DCT stage of the DCT fast algorithm of FIG. 3 on the input data block to result in the scaled transform data. The quantizer 22 is configured so as to quantize the scaled transform data in accordance with a modified quantizer matrix that is obtained by compensating the predetermined original quantizer matrix with a scaling coefficient matrix derived from the scaling DCT stage, i.e. the sixth intrinsic multiplication stage, of the DCT fast algorithm to result in quantized DCT data corresponding to the input data block with no performance degradation. The overall processing speed of the joint cosine transforming and quantizing device 20 is thus greatly enhanced.

By dispensing with the sixth intrinsic multiplication stage of the DCT fast algorithm, the number of multiplication operations performed by the DCT unit 21 can be dramatically reduced. Particularly, for one-dimensional DCT transformation, the total number of multiplication operations is reduced from thirteen to five for an 8×8 input data block, i.e. only about 38% of the multiplication operations remain for scaled one-dimensional DCT. For two-dimensional DCT transformation, only a total number of eighty (2×8×5) multiplication operations are required for completing scaled two-dimensional DCT of the 8×8 input data block.

Two-dimensional DCT generally involves consecutive first and second one-dimensional DCT operations. The second one-dimensional DCT operation is performed on a transposed order of the one-dimensional transform data from the first one-dimensional DCT operation to obtain the two-dimensional transform data corresponding to the input data block.

Figures 5, 6:
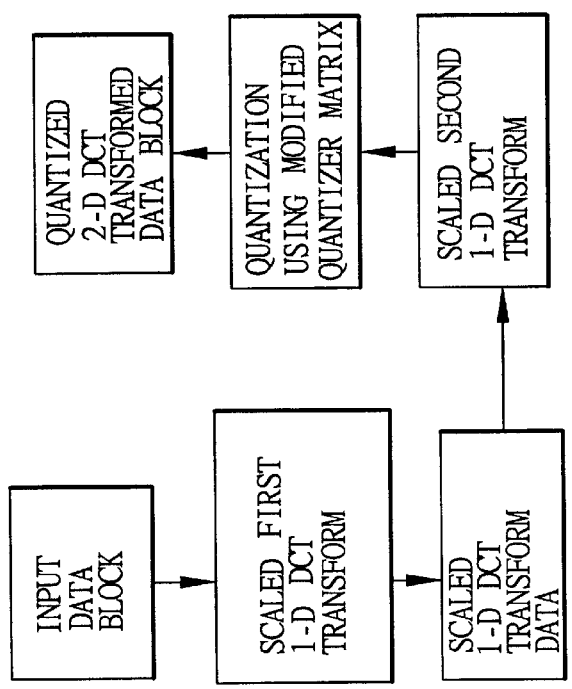
FIG. 5 is a flowchart illustrating the two-dimensional DCT operation of the joint cosine transforming and quantizing device of the preferred embodiment.
FIG. 6 illustrates a scaling coefficient matrix used in modifying a quantizer matrix of a quantizer of the joint cosine transforming and quantizing device of the preferred embodiment.

FIG. 5 is a flowchart illustrating the operation of the joint cosine transforming and quantizing device 20. When the scaled transform data from the DCT unit 21 is two-dimensional transform data, the DCT unit 21 initially performs a scaled first one-dimensional transform operation consisting of the first to fifth stages of the DCT fast algorithm shown in FIG. 3 on the input data block to obtain scaled one-dimensional transform data. Thereafter, the DCT unit 21 performs a scaled second one-dimensional transform operation consisting of the first to fifth stages of the DCT fast algorithm on a transposed order of the scaled one-dimensional transform data to obtain the scaled two-dimensional transform data. The quantizer 22 then quantizes the scaled two-dimensional transform data in accordance with the modified quantizer matrix to result in the quantized two-dimensional DCT data block corresponding to the input data block.

The modified quantizer matrix Q'(i,j) is obtained according to the following equation:

$$Q'(i,j)=Q(i,j)/C(i,j)$$

where Q(i,j) represents the predetermined original quantizer matrix, and C(i,j) represents the scaling coefficient matrix. As shown in FIG. 6, the scaling coefficient matrix C(i,j) is obtained as a product of weighing coefficients of the sixth stage of the DCT fast algorithm in a first one-dimensional DCT transform and in a second one-dimensional DCT transform.

Other terms may be associated with the quantization formula, such as rounding off for sign consideration of the scaled transform data, and incorporating a scaler to the quantizer matrix (e.g. quantizer scale in MPEG). If associated terms are present, the scaling coefficient matrix is also factored into these terms before the quantization operation is performed.

Accordingly, in order to reduce the number of multiplication operations in a video compressing apparatus that includes a DCT unit 21 and a quantizer 22 connected to the DCT unit 21, a predetermined original quantizer matrix is compensated with a scaling coefficient matrix derived from a sixth intrinsic multiplication stage of a six-stage DCT fast algorithm to obtain a modified quantizer matrix. Thereafter, the DCT unit 21 is configured to perform DCT on an input data block based on the scaled DCT stage, i.e. the first to fifth stages, of the DCT fast algorithm while dispensing with the sixth intrinsic multiplication stage, which is the scaling DCT stage, of the DCT fast algorithm to result in scaled transform data. The quantizer 22 is configured so as to quantize the scaled transform data in accordance with the modified quantizer matrix to result in quantized DCT data corresponding to the input data block.

As such, the quantization operation essentially incurs a minor increase in overhead. However, the DCT operation experiences a tremendous reduction in loading. The overall performance is thus improved when the joint cosine transforming and quantizing device 20 of the preferred embodiment is used during video compression.

Referring again to FIGS. 1 and 2, the joint inverse quantizing and inverse cosine transforming device 40, 60 of the preferred embodiment is characterized in that the inverse quantizer 41, 61 is configured so as to dequantize the input quantized DCT data in accordance with a modified dequantizer matrix that is obtained by compensating a predetermined original dequantizer matrix with a pre-scaling coefficient matrix derived from the pre-scaling IDCT stage, i.e. the first intrinsic multiplication stage, of the IDCT fast algorithm shown in FIG. 4 to result in scaled dequantized data. Thereafter, the IDCT unit 42, 62 performs IDCT on the scaled dequantized data based on the scaled IDCT stage, i.e. the second to sixth stages, of the IDCT fast algorithm while dispensing with the first intrinsic multiplication stage of the IDCT fast algorithm to result in IDCT data corresponding to the input quantized DCT data with no performance degradation. The overall processing speed of the joint inverse quantizing and inverse cosine transforming device 40, 60 is thus greatly enhanced.

By dispensing with the first intrinsic multiplication stage of the IDCT fast algorithm, the number of multiplication operations performed by the IDCT unit 42, 62 can be dramatically reduced. Particularly, for one-dimensional IDCT transformation, the total number of multiplication operations is reduced from thirteen to five for an 8×8 input transformed data block, i.e. only about 38% of the multiplication operations remain for scaled one-dimensional IDCT. For two-dimensional IDCT transformation, only a total number of eighty (2×8×5) multiplication operations are required for completing scaled two-dimensional IDCT of the 8×8 input transformed data block.

Two-dimensional IDCT generally involves consecutive first and second one-dimensional IDCT operations. The second one-dimensional IDCT operation is performed on a transposed order of the one-dimensional inverse transform data from the first one-dimensional IDCT operation to obtain the two-dimensional inverse transform data corresponding to the input transformed data block.

Figures 7, 8:
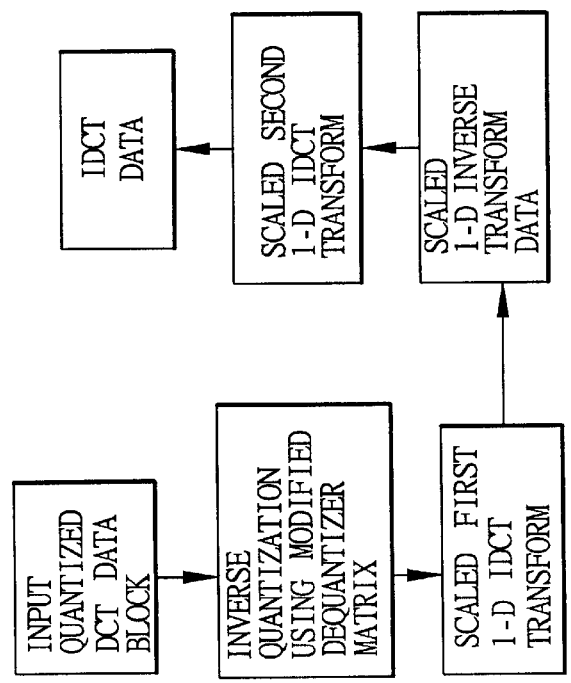
FIG. 7 is a flowchart illustrating the two-dimensional IDCT operation of the joint inverse quantizing and inverse cosine transforming device of the preferred embodiment.
FIG. 8 illustrates a pre-scaling coefficient matrix used in modifying a dequantizer matrix of an inverse quantizer of the joint inverse quantizing and inverse cosine transforming device of the preferred embodiment.

FIG. 7 is a flowchart illustrating the operation of the joint inverse quantizing and inverse cosine transforming device 40, 60 of FIGS. 1 and 2. When the IDCT data from the IDCT unit 42, 62 of the preferred embodiment is two-dimensional IDCT transform data, the inverse quantizer 41, 61 initially dequantizes the input quantized DCT data block in accordance with the modified dequantizer matrix to result in scaled dequantized data. Thereafter, the IDCT unit 42, 62 performs a scaled first one-dimensional inverse transform operation consisting of the second to sixth stages of the IDCT fast algorithm shown in FIG. 4 on the scaled dequantized data to obtain scaled one-dimensional inverse transform data. The IDCT unit 42, 62 further performs a scaled second one-dimensional inverse transform operation consisting of the second to sixth stages of the IDCT fast algorithm on a transposed order of the scaled one-dimensional inverse transform data to obtain the IDCT data corresponding to the input quantized DCT data block.

The modified dequantizer matrix Q'(i, j) is obtained according to the following equation:

$$Q'(i,j)=Q(i,j)*P(i,j)$$

where Q(i,j) represents the predetermined original dequantizer matrix, and P(i,j) represents the pre-scaling coefficient matrix. As shown in FIG. 8, the pre-scaling coefficient matrix P(i,j) is obtained as a product of weighing coefficients of the first intrinsic multiplication stage of the IDCT fast algorithm in a first one-dimensional IDCT transform and in a second one-dimensional IDCT transform.

Other terms may be associated with the dequantization formula, such as adjustment for sign consideration of the quantized and dequantized DCT transform data, and incorporating a scaler to the quantizer matrix (e.g. quantizer scale in MPEG). If associated terms are present, the pre-scaling coefficient matrix is also factored into these terms before the dequantization operation is performed.

Accordingly, in order to reduce the number of multiplication operations in a video compressing/decompressing apparatus that includes an inverse quantizer 41, 61 and an IDCT unit 42, 62 connected to the inverse quantizer 41, 61, a predetermined original dequantizer matrix is compensated with a pre-scaling coefficient matrix derived from a pre-scaling IDCT stage, i.e. the first intrinsic multiplication stage, of a six-stage IDCT fast algorithm to obtain a modified dequantizer matrix. Thereafter, the inverse quantizer 41, 61 is configured so as to dequantize input quantized DCT data in accordance with the modified dequantizer matrix to result in scaled dequantized data. The IDCT unit 42, 62 is configured to perform IDCT on the scaled dequantized data based on the scaled IDCT stage, i.e. the second to sixth stages, of the IDCT fast algorithm while dispensing with the first intrinsic multiplication stage of the IDCT fast algorithm to result in IDCT data corresponding to the input quantized DCT data.

As such, the inverse quantization operation essentially incurs a minor increase in overhead. However, the IDCT operation experiences a tremendous reduction in loading. The overall performance is thus improved when the joint inverse quantizing and inverse cosine transforming device 40, 60 of the preferred embodiment is used during video compression and decompression.

Figure 9:
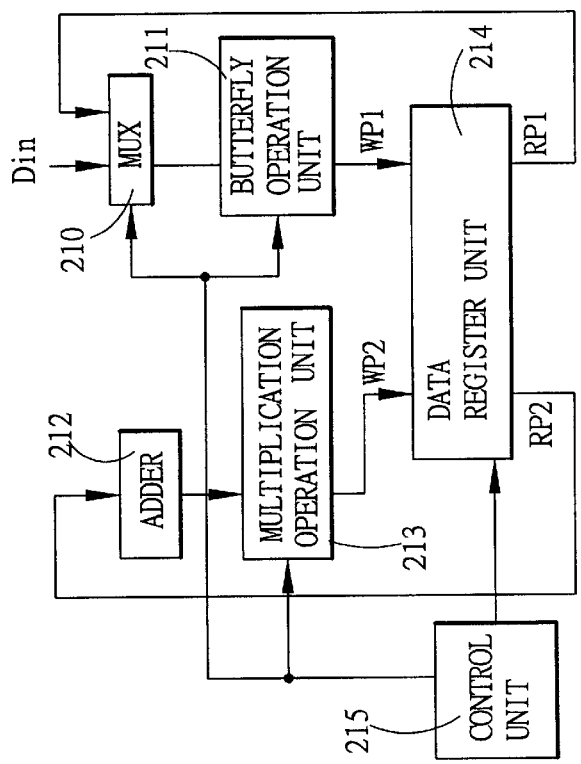
FIG. 9 is a schematic circuit block diagram illustrating a DCT unit of the joint cosine transforming and quantizing device of the preferred embodiment.

FIG. 9 is a schematic circuit block diagram illustrating the DCT unit of the preferred embodiment of a joint cosine transforming and quantizing device according to the present invention. The DCT unit includes an input multiplexer 210, a butterfly operation unit 211, an adder 212, a multiplication operation unit 213, a data register unit 214, and a control unit 215.

The data register unit 214 is a four-port memory device with first and second write ports (WP1, WP2) and first and second read ports (RP1, RP2).

The input multiplexer 210 has a first data input that is adapted to receive a sequence of serial input data (Din) of an 8×8 input data block from an external device (not shown), a second data input that is connected to the first read port (RP1) of the data register unit 214, a data output connected to the butterfly operation unit 211, and a select input connected to the control unit 215. The input multiplexer 210 is controlled by the control unit 215 to provide a selected one of the input data (Din) or the data from the data register unit 214 to the butterfly operation unit 211.

The butterfly operation unit 211 is known in the art, and generates the sum and difference of two input data thereto. The output of the butterfly operation unit 211 is connected to the first write port (WP1) of the data register unit 214.

The adder 212 has a data input connected to the second read port (RP2) of the data register unit 214. The adder 212 generates the sum of two successive input data from the data register unit 214. The adder 212 has a data output connected to the multiplication operation unit 213.

The multiplication operation unit 213 performs a multiplication operation for input data received from the adder 212. The multiplication operation unit 213 has a data output connected to the second write port (WP2) of the data register unit 214.

The control unit 215 is responsible for controlling read/write operations of the data register unit 214, and is also responsible for controlling the input multiplexer 210. The control unit 215 is further responsible for controlling the timing of the operations of the remaining components of the DCT unit.

In use, when the DCT unit is employed so as to perform a one-dimensional scaled DCT operation, the pixel data of the 8×8 pixel block are sequentially provided to the input multiplexer 210 in rows (or columns). The control unit 215 controls the input multiplexer 210 to send the input pixel data (Din) to the butterfly operation unit 211 in order to enable the latter to perform the first butterfly stage of the DCT fast algorithm. The control unit 215 then controls the data register unit 214 so that the first-stage output data from the butterfly operation unit 211 are stored therein via the first write port (WP1). When predetermined ones of the first-stage output data have been stored in the data register unit 214, the control unit 215 controls the data register unit 214 to provide the predetermined ones of the first-stage output data to the adder 212 via the second read port (RP2) in order to enable the adder 212 and the multiplication operation unit 213 to perform the second post-addition multiplication stage of the DCT fast algorithm, while the butterfly operation unit 211 continues to perform the first butterfly stage of the DCT fast algorithm. The control unit 215 again controls the data register unit 214 to store the second-stage output data from the multiplication operation unit 213 therein via the second write port (WP2). After the butterfly operation unit 211 has finished performing the first butterfly stage of the DCT fast algorithm, the control unit 215 controls the data register unit 214 to provide the first-stage and second-stage output data in a predetermined sequence to the input multiplexer 210 via the first read port (RP1). At this time, the input multiplexer 210 is controlled by the control unit 215 to send the output data from the data register unit 214 to the butterfly operation unit 211 in order to enable the latter to perform the third butterfly stage of the DCT fast algorithm. The control unit 215 again controls the data register unit 214 so that the third-stage output data from the butterfly operation unit 211 are stored therein via the first write port (WP1). When predetermined ones of the third-stage output data have been stored in the data register unit 214, the control unit 215 controls the data register unit 214 to provide the predetermined ones of the third-stage output data to the adder 212 via the second read port (RP2) in order to enable the adder 212 and the multiplication operation unit 213 to perform the fourth post-addition multiplication stage of the DCT fast algorithm, while the butterfly operation unit 211 continues to perform the third butterfly stage of the DCT fast algorithm. The control unit 215 again controls the data register unit 214 to store the fourth-stage output data from the multiplication operation unit 213 therein via the second write port (WP2). After the butterfly operation unit 211 has finished performing the third butterfly stage of the DCT fast algorithm, the control unit 215 controls the data register unit 214 to provide the third-stage and fourth-stage output data in a predetermined sequence to the butterfly operation unit 211 via the input multiplexer 210 and the first read port (RP1). The butterfly operation unit 211 can thus perform the fifth butterfly stage of the DCT fast algorithm at this time. The fifth-stage output data from the butterfly operation unit 211 serves as the scaled one-dimensional transform data of the DCT unit.

If two-dimensional DCT is performed, the control unit 215 controls the data register 214 to output sequentially the fifth-stage output data of the first one-dimensional DCT transform in columns (or rows) back to the butterfly operation unit 211 via the input multiplexer 210 and the first read port (RP1), thereby starting the second one-dimensional transformation. The operation of the second one-dimensional transformation is similar to that of the first one-dimensional transformation. The output of the butterfly operation unit 211 after the fifth butterfly stage of the second one-dimensional transformation is the scaled two-dimensional transform data of the DCT unit that is provided to the quantizer of the joint cosine transforming and quantizing device of the preferred embodiment.

Figure 10:
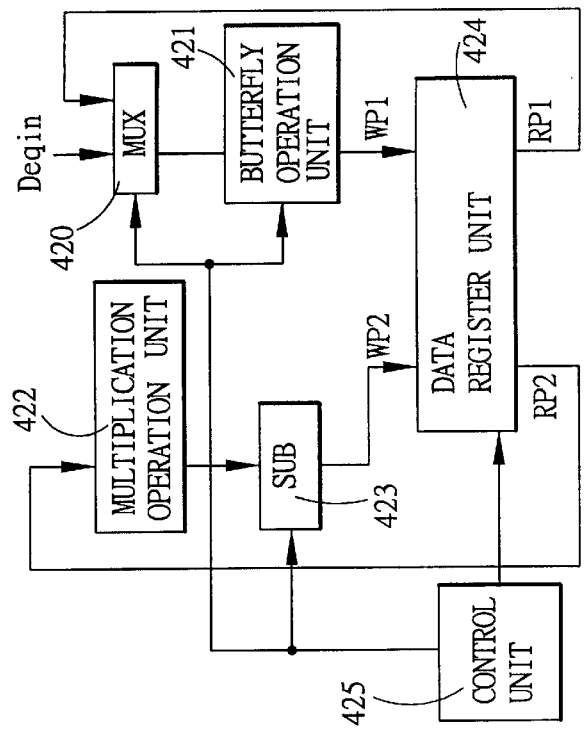
FIG. 10 is a schematic circuit block diagram illustrating an IDCT unit of the joint inverse quantizing and inverse cosine transforming device of the preferred embodiment.

FIG. 10 is a schematic circuit block diagram illustrating the IDCT unit of the preferred embodiment of a joint inverse quantizing and inverse cosine transforming device according to the present invention. The IDCT unit includes an input multiplexer 420, a butterfly operation unit 421, a multiplication operation unit 422, a subtracter 423, a data register unit 424, and a control unit 425.

The data register unit 424 is a four-port memory device with first and second write ports (WP1, WP2) and first and second read ports (RP1, RP2).

The input multiplexer 420 has a first data input that receives a sequence of serial input data (Deqin) of an 8×8 scaled dequantized data block from the inverse quantizer, a second data input that is connected to the first read port (RP1) of the data register unit 424, a data output connected to the butterfly operation unit 421, and a select input connected to the control unit 425. The input multiplexer 420 is controlled by the control unit 425 to provide a selected one of the input data (Deqin) or the data from the data register unit 424 to the butterfly operation unit 421.

The butterfly operation unit 421 is known in the art, and generates the sum and difference of two input data thereto. The output of the butterfly operation unit 421 is connected to the first write port (WP1) of the data register unit 424.

The multiplication operation unit 422 has a data input connected to the second read port (RP2) of the data register unit 424, and a data output connected to the subtracter 423.

The subtracter 423 performs a subtraction operation for input data received from the multiplication operation unit 422, and has an output connected to the second write port (WP2) of the data register unit 424.

The control unit 425 is responsible for controlling read/write operations of the data register unit 424, and is also responsible for controlling the input multiplexer 420. The control unit 425 is further responsible for controlling the timing of the operations of the remaining components of the IDCT unit.

In use, when the IDCT unit is employed so as to perform a one-dimensional scaled IDCT operation, the 8×8 pixel scaled dequantized data block from the inverse quantizer are sequentially provided to the input multiplexer 420 in rows (or columns). The control unit 425 controls the input multiplexer 420 to send the input scaled dequantized data (Deqin) to the butterfly operation unit 421 in order to enable the latter to perform the second butterfly stage of the IDCT fast algorithm. The control unit 425 then controls the data register unit 424 so that the second-stage output data from the butterfly operation unit 421 are stored therein via the first write port (WP1). When predetermined ones of the second-stage output data have been stored in the data register unit 424, the control unit 425 controls the data register unit 424 to provide the predetermined ones of the second-stage output data to the multiplication operation unit 422 via the second read port (RP2) in order to enable the multiplication operation unit 422 and the subtracter 423 to perform the third post-multiplication subtraction stage of the IDCT fast algorithm, while the butterfly operation unit 421 continues to perform the second butterfly stage of the IDCT fast algorithm. The control unit 425 again controls the data register unit 424 to store the third-stage output data from the subtracter 423 therein via the second write port (WP2). After the butterfly operation unit 421 has finished performing the second butterfly stage of the IDCT fast algorithm, the control unit 425 controls the data register unit 424 to provide the second-stage and third-stage output data in a predetermined sequence to the input multiplexer 420 via the first read port (RP1). At this time, the input multiplexer 420 is controlled by the control unit 425 to send the output data from the data register unit 424 to the butterfly operation unit 421 in order to enable the latter to perform the fourth butterfly stage of the IDCT fast algorithm. The control unit 425 again controls the data register unit 424 so that the fourth-stage output data from the butterfly operation unit 421 are stored therein via the first write port (WP1). When predetermined ones of the fourth-stage output data have been stored in the data register unit 424, the control unit 425 controls the data register unit 424 to provide the predetermined ones of the fourth-stage output data to the multiplication operation unit 422 via the second read port (RP2) in order to enable the multiplication operation unit 422 and the subtracter 423 to perform the fifth post-multiplication subtraction stage of the IDCT fast algorithm. The control unit 425 again controls the data register unit 424 to store the fifth-stage output data from the subtracter 423 therein via the second write port (WP2). After the butterfly operation unit 421 has finished performing the fourth butterfly stage of the IDCT fast algorithm, the control unit 425 controls the data register unit 424 to provide the fourth-stage and fifth-stage output data in a predetermined sequence to the butterfly operation unit 421 via the input multiplexer 420 and the first read port (RP1). The butterfly operation unit 421 can thus perform the sixth butterfly stage of the IDCT fast algorithm at this time. The sixth-stage output data from the butterfly operation unit 421 serves as the inverse one-dimensional transform data of the IDCT unit.

If two-dimensional IDCT is performed, the control unit 425 controls the data register 424 to output sequentially the sixth-stage output data of the first one-dimensional IDCT transform in columns (or rows) back to the butterfly operation unit 421 via the input multiplexer 420 and the first read port (RP1), thereby starting the second one-dimensional inverse transformation. The operation of the second one-dimensional inverse transformation is similar to that of the first one-dimensional inverse transformation. The output of the butterfly operation unit 421 after the sixth butterfly stage of the second one-dimensional inverse transformation is the inverse two-dimensional transform data of the IDCT unit.

Figure 11:
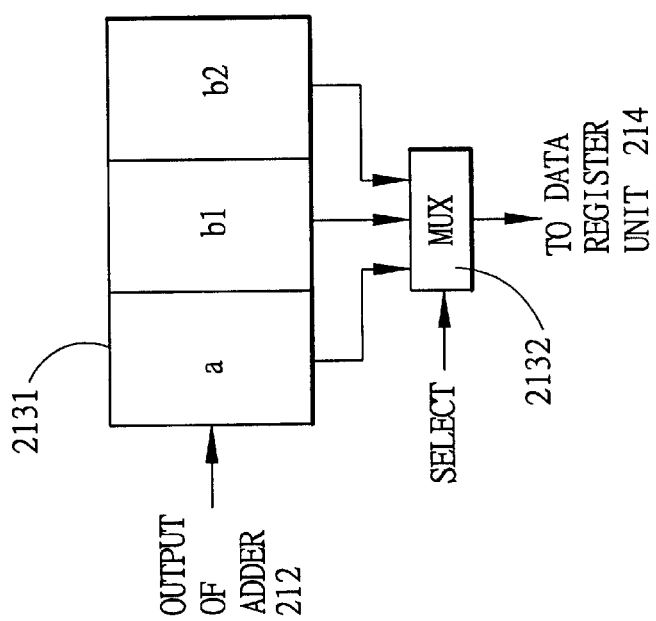
FIG. 11 illustrates a preferred implementation of a multiplication operation unit for the DCT unit of FIG. 9.

Referring again to FIG. 3, for every one-dimensional DCT operation, only five multiplication operations remain for a row of 8 points data. Three of the five multiplication operations share the same coefficient $a=\cos(4\pi/16)$. The coefficients for the other two multiplication operations are $b1=1/[2*\cos(2\pi/16)]$ and $b2=1/[2*\cos(6\pi/16)]$, respectively. FIG. 11 shows one embodiment of the multiplication operation unit for the DCT unit. Because the multiplication operations of the scaled DCT stage only incorporate three coefficients, the multiplication operation unit is implemented in a look-up table device that includes a look-up table 2131 and an output multiplexer 2132 to lower the complexity of the DCT unit. As illustrated, the look-up table 2131 has a first data field which contains products associated with the first coefficient (a), a second data field which contains products associated with the second coefficient (b1), and a third data field which contains products associated with the third coefficient (b2). The look-up table 2131 is addressed by the output of the adder 212, and has a first output corresponding to the first data field, a second output corresponding to the second data field, and a third output corresponding to the third data field. The output multiplexer 2132 has data inputs connected to the first, second and third outputs of the look-up table 2131, a data output connected to the data register unit 214, and a select input connected to the control unit 215.

In operation, the output of the adder 212 is used to control the look-up table 2131 to output products, that correspond to the adder output and that are stored in the first, second and third data fields, at the first, second and third outputs. The output multiplexer 2132 is controlled by the control unit 215 to select an appropriate one of the first, second and third outputs of the look-up table 2131 and to provide the product at the selected one of the first, second and third outputs to the data register unit 214.

Figure 12:
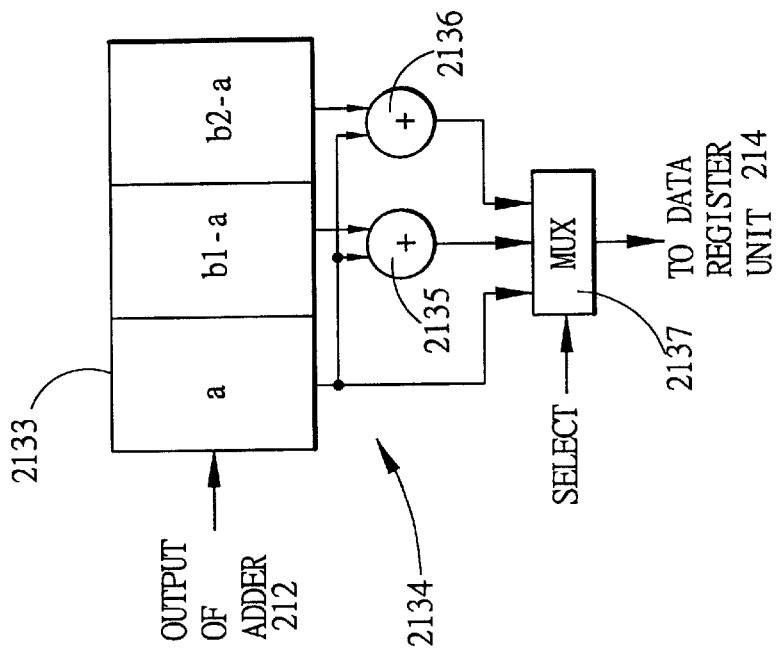
FIG. 12 illustrates another preferred implementation of the multiplication operation unit for the DCT unit of FIG. 9.

FIG. 12 shows another embodiment of the multiplication operation unit for the DCT unit. Unlike the embodiment of FIG. 11, a coding scheme is employed in the look-up table 2133 such that a decoding unit 2134 is needed between the look-up table 2133 and the output multiplexer 2137. In the embodiment of FIG. 12, the second and third data fields of the look-up table 2133 are encoded using DPCM relative to the first coefficient (a). That is to say, the second data field contains products associated with the differential coefficient (b1−a), while the third data field contains products associated with the differential coefficient (b2−a). The decoding unit 2134 includes adders 2135, 2136 which serve as a combining unit to add data at the first output of the look-up table 2133 to the second and third outputs of the look-up table 2133, respectively, in order to recover the products associated with the second and third coefficients (b1), (b2). The output multiplexer 2137 has data inputs connected to the first output of the look-up table 2133 and the outputs of the adders 2135, 2136, a data output connected to the data register unit 214, and a select input connected to the control unit 215. The output multiplexer 2137 is controlled by the control unit 215 to select an appropriate one of the data inputs thereof and to provide the data at the selected data input to the data register unit 214. The effect of the coding scheme is to reduce the size of the look-up table 2133 as compared to that in the embodiment of FIG. 11, thereby resulting in reduced implementation costs.

Figure 13:
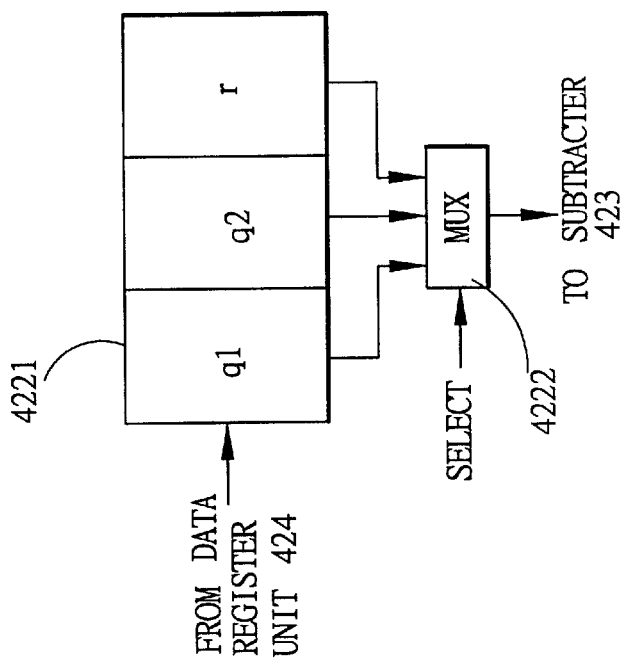
FIG. 13 illustrates a preferred implementation of a multiplication operation unit for the IDCT unit of FIG. 10.

Referring again to FIG. 4, for every one-dimensional IDCT operation, only five multiplication operations remain for a row of 8 points data. Three of the five multiplication operations share the same coefficient $r=2*\cos(4\pi/16)$. The coefficients for the other two multiplication operations are $q1=2*\cos(2\pi/16)$ and $q2=2*\cos(6\pi/16)$, respectively. FIG. 13 shows one embodiment of the multiplication operation unit for the IDCT unit. Because the multiplication operations of the scaled IDCT stage only incorporate three coefficients, the multiplication operation unit is implemented in a look-up table device that includes a look-up table 4221 and an output multiplexer 4222 to lower the complexity of the IDCT unit. As illustrated, the look-up table 4221 has a first data field which contains products associated with the first coefficient (q1), a second data field which contains products associated with the second coefficient (q2), and a third data field which contains products associated with the third coefficient (r). The look-up table 4221 is addressed by data at the second read port of the data register unit 424, and has a first output corresponding to the first data field, a second output corresponding to the second data field, and a third output corresponding to the third data field. The output multiplexer 4222 has data inputs connected to the first, second and third outputs of the look-up table 4221, a data output connected to the subtracter 423, and a select input connected to the control unit 425.

In operation, the output of the data register unit 424 is used to control the look-up table 4221 to output products, that correspond to the data at the second read port of the data register unit and that are stored in the first, second and third data fields, at the first, second and third outputs. The output multiplexer 4222 is controlled by the control unit 425 to select an appropriate one of the first, second and third outputs of the look-up table 4221 and to provide the product at the selected one of the first, second and third outputs to the subtracter 423.

Figure 14:
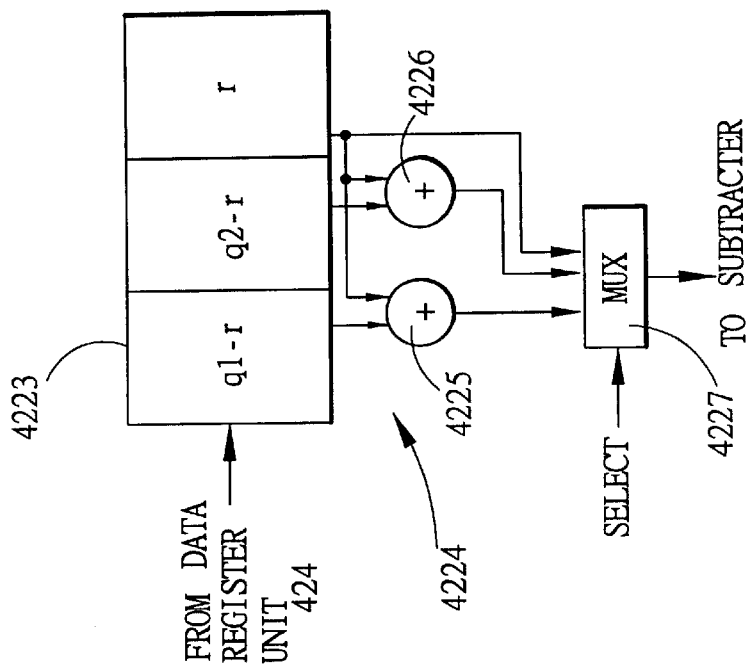
FIG. 14 illustrates another preferred implementation of the multiplication operation unit for the IDCT unit of FIG. 10.

FIG. 14 shows another embodiment of the multiplication operation unit for the IDCT unit. Unlike the embodiment of FIG. 13, a coding scheme is employed in the look-up table 4223 such that a decoding unit 4224 is needed between the look-up table 4223 and the output multiplexer 4227. In the embodiment of FIG. 13, the first and second data fields of the look-up table 4223 are encoded using DPCM relative to the third coefficient (r). That is to say, the first data field contains products associated with the differential coefficient (q1−r), while the second data field contains products associated with the differential coefficient (q2−r). The decoding unit 4224 includes adders 4225, 4226 which serve as a combining unit to add data at the third output of the look-up table 4223 to the first and second outputs of the look-up table 4223, respectively, in order to recover the products associated with the first and second coefficients (q1), (q2). The output multiplexer 4227 has data inputs connected to the third output of the look-up table 4223 and the outputs of the adders 4225, 4226, a data output connected to the subtracter 423, and a select input connected to the control unit 425. The output multiplexer 4227 is controlled by the control unit 425 to select an appropriate one of the data inputs thereof and to provide the data at the selected data input to the subtracter 423. The effect of the coding scheme is to reduce the size of the look-up table 4223 as compared to that in the embodiment of FIG. 13, thereby resulting in reduced implementation costs.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A joint cosine transforming and quantizing device, comprising:

a discrete cosine transforming unit for performing discrete cosine transform (DCT) on an input data block based on a six-stage DCT fast algorithm that is separated into a scaled DCT stage and a scaling DCT stage, the scaled DCT stage including a first butterfly stage, a second post-addition multiplication stage, a third butterfly stage, a fourth post-addition multiplication stage, and a fifth butterfly stage, the scaling DCT stage including a sixth intrinsic multiplication stage, said discrete cosine transforming unit dispensing with the scaling DCT stage to result in scaled transform data; and a quantizer connected to said discrete cosine transforming unit for quantizing the scaled transform data in accordance with a modified quantizer matrix that is obtained by compensating a predetermined original quantizer matrix with a scaling coefficient matrix derived from the scaling DCT stage of the DCT fast algorithm to result in quantized DCT data corresponding to the input data block;

said discrete cosine transforming unit including a data register unit having first and second write ports and first and second read ports, an input multiplexer having a first data input adapted to receive the input data block, a second data input connected to said first read port of said data register unit, and a data output, said input multiplexer being operable so as to provide data at a selected one of said first and second data inputs to said data output, a butterfly operation unit having an input connected to said data output of said input multiplexer, and an output connected to said first write port of said data register unit, said butterfly operation unit being operable so as to perform the first, third and fifth butterfly stages of the DCT fast algorithm and so as to generate respectively first-stage, third-stage and fifth-stage output data when performing the first, third and fifth butterfly stages of the DCT fast algorithm, an adder having a data input connected to said second read port of said data register unit and a data output, and a multiplication operation unit having an input connected to said data output of said adder, and an output connected to said second write port of said data register unit, said adder and said multiplication operation unit being operable so as to perform the second and fourth post-addition multiplication stages of the DCT fast algorithm and so as to generate respectively second-stage and fourth-stage output data when performing the second and fourth post-addition multiplication stages of the DCT fast algorithm, said multiplication operation unit including a look-up table and an output multiplexer, said look-up table having a number of data fields, each of which contains products associated with a respective one of a corresponding number of coefficients used in the second and fourth post-addition multiplication stages of the DCT fast algorithm, said look-up table further having a number of outputs corresponding respectively to said data fields, said look-up table being connected to said data output of said adder so as to be addressed by data thereat in order to output the products, that correspond to the data from said adder and that are stored in said data fields, at said outputs of said look-up table, said output multiplexer having data inputs connected to said outputs of said look-up table, and a data output connected to said second write port of said data register unit, said output multiplexer being operable so as to select one of said data inputs thereof and provide data at the selected one of said data inputs thereof to said data register unit.

2. The joint cosine transforming and quantizing device as claimed in claim 1, wherein at least one of said data fields of said look-up table is encoded, said multiplication operation unit further including a decoding unit that interconnects said look-up table and said output multiplexer so as to decode data at said outputs of said look-up table unit and provide decoded data to said data inputs of said output multiplexer.

3. The joint cosine transforming and quantizing device as claimed in claim 2, wherein said at least one of said data fields of said look-up table is encoded in terms of a predetermined other one of said data fields, said decoding unit including combining means for combining data at said output of said look-up table that corresponds to said predetermined other one of said data fields with data at said output of said look-up table that corresponds to said at least one of said data fields to generate said decoded data.

4. The joint cosine transforming and quantizing device as claimed in claim 1, wherein said discrete cosine transforming unit further includes a control unit connected to said input multiplexer, said butterfly operation unit, said multiplication operation unit, and said data register unit, said control unit controlling said input multiplexer to provide the input data block to said butterfly operation unit in order to enable said butterfly operation unit to perform the first butterfly stage of the DCT fast algorithm, said control unit further controlling said data register unit to store the first-stage output data from said butterfly operation unit therein, said control unit further controlling said data register unit to provide predetermined ones of the first-stage output data to said adder in order to enable said adder and said multiplication operation unit to begin performing the second post-addition multiplication stage of the DCT fast algorithm when the predetermined ones of the first-stage output data have been stored in said data register unit, while said butterfly operation unit continues to perform the first butterfly stage of the DCT fast algorithm, said control unit further controlling said data register unit to store the second-stage output data from said multiplication operation unit therein, said control unit further controlling said data register unit and said input multiplexer to provide the first-stage and second-stage output data in a predetermined sequence to said butterfly operation unit in order to enable said butterfly operation unit to perform the third butterfly stage of the DCT fast algorithm after said butterfly operation unit has finished performing the first butterfly stage of the DCT fast algorithm, said control unit further controlling said data register unit to store the third-stage output data from said butterfly operation unit therein, said control unit further controlling said data register unit to provide predetermined ones of the third-stage output data to said adder in order to enable said adder and said multiplication operation unit to begin performing the fourth post-addition multiplication stage of the DCT fast algorithm when the predetermined ones of the third-stage output data have been stored in said data register unit, while said butterfly operation unit continues to perform the third butterfly stage of the DCT fast algorithm, said control unit further controlling said data register unit to store the fourth-stage output data from said multiplication operation unit therein, said control unit further controlling said data register unit and said input multiplexer to provide the third-stage and fourth-stage output data in a predetermined sequence to said butterfly operation unit in order to enable said butterfly operation unit to perform the fifth butterfly stage of the DCT fast algorithm after said butterfly operation unit has finished performing the third butterfly stage of the DCT fast algorithm.

5. The joint cosine transforming and quantizing device as claimed in claim 1, wherein the scaled transform data is two-dimensional transform data, said discrete cosine transforming unit performing a scaled first one-dimensional transform operation consisting of the scaled,DCT stage of the DCT fast algorithm on the input data block to obtain scaled one-dimensional transform data, and further performing a scaled second one-dimensional transform operation consisting of the scaled DCT stage of the DCT fast algorithm on a transposed order of the scaled one-dimensional transform data to obtain the scaled transform data, the scaling coefficient matrix used in compensating the predetermined original quantizer matrix being a product of weighing coefficients of the sixth intrinsic multiplication stage of the DCT fast algorithm in a first one-dimensional DCT transform and in a second one-dimensional DCT transform.

6. A joint inverse quantizing and inverse cosine transforming device, comprising:

an inverse quantizer for dequantizing input quantized discrete cosine transform (DCT) data in accordance with a modified dequantizer matrix that is obtained by compensating a predetermined original dequantizer matrix with a pre-scaling coefficient matrix derived from a pre-scaling inverse discrete cosine transform (IDCT) stage of a six-stage IDCT fast algorithm to result in scaled dequantized data, the pre-scaling IDCT stage including a first intrinsic multiplication stage of the IDCT fast algorithm, the IDCT fast algorithm further having a scaled IDCT stage that includes a second butterfly stage, a third post-multiplication subtraction stage, a fourth butterfly stage, a fifth post-multiplication subtraction stage, and a sixth butterfly stage; and an inverse discrete cosine transforming unit connected to said inverse quantizer and operable to perform the scaled IDCT stage of the IDCT fast algorithm on the scaled dequantized data, said inverse discrete cosine transforming unit dispensing with the pre-scaling IDCT stage of the IDCT fast algorithm to result in IDCT data corresponding to the input quantized DCT data;

said inverse discrete cosine transforming unit including
a data register unit having first and second write ports and first and second read ports, an input multiplexer having a first data input to receive the scaled dequantized data, a second data input connected to said first read port of said data register unit, and a data output, said input multiplexer being operable so as to provide data at a selected one of said first and second data inputs to said data output, a butterfly operation unit having an input connected to said data output of said input multiplexer, and an output connected to said first write port of said data register unit, said butterfly operation unit being operable so as to perform the second, fourth and sixth butterfly stages of the IDCT fast algorithm and so as to generate respectively second-stage, fourth-stage and sixth-stage output data when performing the second, fourth and sixth butterfly stages of the IDCT fast algorithm, a multiplication operation unit having a data input connected to said second read port of said data register unit and a data output, and a subtracter having an input connected to said data output of said multiplication operation unit, and an output connected to said second write port of said data register unit, said multiplication operation unit and said subtracter being operable so as to perform the third and fifth post-multiplication subtraction stages of the IDCT fast algorithm and so as to generate respectively third-stage and fifth-stage output data when performing the third and fifth post-multiplication subtraction stages of the IDCT fast algorithm, said multiplication operation unit including a look-up table and an output multiplexer, said look-up table having a number of data fields, each of which contains products associated with a respective one of a corresponding number of coefficients used in the third and fifth post-multiplication subtraction stages of the IDCT fast algorithm, said look-up table further having a number of outputs corresponding respectively to said data fields, said look-up table being connected to said second read port of said data register unit so as to be addressed by data thereat in order to output the products, that correspond to the data from said second read port and that are stored in said data fields, at said outputs of said look-up table, said output multiplexer having data inputs connected to said outputs of said look-up table, and a data output connected to said input of said subtracter, said output multiplexer being operable so as to select one of said data inputs thereof and provide data at the selected one of said data inputs thereof to said subtracter.

7. The joint inverse quantizing and inverse cosine transforming device as claimed in claim 6, wherein at least one of said data fields of said look-up table is encoded, said multiplication operation unit further including a decoding unit that interconnects said look-up table and said output multiplexer so as to decode data at said outputs of said look-up table unit and provide decoded data to said data inputs of said output multiplexer.

8. The joint inverse quantizing and inverse cosine transforming device as claimed in claim 7, wherein said at least one of said data fields of said look-up table is encoded in terms of a predetermined other one of said data fields, said decoding unit including combining means for combining data at said output of said look-up table that corresponds to said predetermined other one of said data fields with data at said output of said look-up table that corresponds to said at least one of said data fields to generate said decoded data.

9. The joint inverse quantizing and inverse cosine transforming device as claimed in claim 6, wherein said inverse discrete cosine transforming unit further includes a control unit connected to said input multiplexer, said butterfly operation unit, said multiplication operation unit, and said data register unit, said control unit controlling said input multiplexer to provide the scaled dequantized data to said butterfly operation unit in order to enable said butterfly operation unit to perform the second butterfly stage of the IDCT fast algorithm, said control unit further controlling said data register unit to store the second-stage output data from said butterfly operation unit therein, said control unit further controlling said data register unit to provide predetermined ones of the second-stage output data to said multiplication operation unit in order to enable said multiplication operation unit and said subtracter to begin performing the third post-multiplication subtraction stage of the IDCT fast algorithm when the predetermined ones of the second-stage output data have been stored in said data register unit, while said butterfly operation unit continues to perform the second butterfly stage of the IDCT fast algorithm, said control unit further controlling said data register unit to store the third-stage output data from said subtracter therein, said control unit further controlling said data register unit and said input multiplexer to provide the second-stage and third-stage output data in a predetermined sequence to said butterfly operation unit in order to enable said butterfly operation unit to perform the fourth butterfly stage of the IDCT fast algorithm after said butterfly operation unit has finished performing the second butterfly stage of the IDCT fast algorithm, said control unit further controlling said data register unit to store the fourth-stage output data from said butterfly operation unit therein, said control unit further controlling said data register unit to provide predetermined ones of the fourth-stage output data to said multiplication operation unit in order to enable said multiplication operation unit and said subtracter to begin performing the fifth post-multiplication subtraction stage of the IDCT fast algorithm when the predetermined ones of the fourth-stage output data have been stored in said data register unit, while said butterfly operation unit continues to perform the fourth butterfly stage of the IDCT fast algorithm, said control unit further controlling said data register unit to store the fifth-stage output data from said subtracter therein, said control unit further controlling said data register unit and said input multiplexer to provide the fourth-stage and fifth-stage output data in a predetermined sequence to said butterfly operation unit in order to enable said butterfly operation unit to perform the sixth butterfly stage of the IDCT fast algorithm after said butterfly operation unit has finished performing the fourth butterfly stage of the IDCT fast algorithm.

10. The joint inverse quantizing and inverse cosine transforming device as claimed in claim 6, wherein the IDCT data is two-dimensional inverse transform data, said inverse discrete cosine transforming unit performing a scaled first one-dimensional inverse transform operation consisting of the scaled IDCT stage of the IDCT fast algorithm on the scaled dequantized data to obtain scaled one-dimensional inverse transform data, and further performing a scaled second one-dimensional inverse transform operation consisting of the scaled IDCT stage of the IDCT fast algorithm on a transposed order of the scaled one-dimensional inverse transform data to obtain the IDCT data, the pre-scaling coefficient matrix used in compensating the predetermined original dequantizer matrix being a product of weighing coefficients of the first intrinsic multiplication stage of the IDCT fast algorithm in a first one-dimensional IDCT transform and in a second one-dimensional IDCT transform.

* * * * *